United States Patent [19]

Evani

[11] 4,432,881
[45] Feb. 21, 1984

[54] WATER-DISPERSIBLE HYDROPHOBIC THICKENING AGENT

[75] Inventor: Syamalarao Evani, Midland, Mich.

[73] Assignee: The Dow Chemical Company, Midland, Mich.

[21] Appl. No.: 232,327

[22] Filed: Feb. 6, 1981

[51] Int. Cl.$^3$ .................. C09K 7/02; E21B 43/22; E21B 43/26

[52] U.S. Cl. ............... 252/8.5 A; 252/8.5 C; 252/8.55 R; 252/8.55 D; 252/315.1; 524/375; 524/401; 524/423; 524/436; 524/555

[58] Field of Search ............ 252/8.55 R, 8.55 D, 252/8.5 C, 316, 8.5 A, 315.1; 524/375, 555, 423, 436, 401

[56] References Cited

U.S. PATENT DOCUMENTS

| | | | |
|---|---|---|---|
| 2,816,882 | 12/1957 | Schiller | 252/356 X |
| 3,039,529 | 6/1962 | McKennon | 252/8.55 X |
| 3,350,338 | 10/1967 | Savage | 524/555 X |
| 3,583,486 | 6/1971 | Stratton | 252/8.55 X |
| 3,624,019 | 11/1971 | Anderson et al. | 524/555 X |
| 3,739,848 | 6/1973 | Lawson et al. | 252/8.55 X |
| 3,744,566 | 7/1973 | Szabo et al. | 252/8.55 X |
| 3,891,591 | 6/1975 | Chang et al. | 524/555 X |
| 3,945,437 | 3/1976 | Chiu et al. | 252/8.55 X |
| 3,948,783 | 4/1976 | Szabo et al. | 252/8.55 |
| 3,984,333 | 10/1976 | van de Kraats et al. | 252/8.55 |
| 4,110,232 | 8/1978 | Schwab et al. | 252/8.55 |
| 4,222,881 | 9/1980 | Byham et al. | 252/8.55 |

FOREIGN PATENT DOCUMENTS 13836  6/1980  European Pat. Off.

*Primary Examiner*—Herbert B. Guynn
*Attorney, Agent, or Firm*—M. S. Jenkins

[57] ABSTRACT

An aqueous liquid medium having increased low shear viscosity as provided by dispersing into the aqueous medium (1) a water-soluble polymer having pendant hydrophobic groups, e.g., an acrylamide dodecyl acrylate copolymer, and (2) a water-dispersible surfactant, e.g., sodium oleate, or dodecyl polyethyleneoxy glycol monoether. The thickened aqueous medium is suitably emloyed in applications requiring viscous liquids which retain their viscosity when subjected to shear, heat or high electrolyte (salt) concentrations. Such applications include uses in enhanced oil recovery processes, as fluid mobility control agents, fracturing fluids and drilling muds, as well as hydraulic fluids and lubricants in many applications.

36 Claims, No Drawings

WATER-DISPERSIBLE HYDROPHOBIC THICKENING AGENT

BACKGROUND OF THE INVENTION

This invention relates to thickening agents containing water-dispersible polymers which agents are used to increase the viscosity of aqueous media.

As taught in *Encyclopedia of Polymer Science and Technology*, Interscience Publishers, Vol. I, 192 (1964), it is known that the viscosity of an aqueous medium is increased by the addition of a water-soluble polymer. Such water-soluble polymers include polyacrylamide, acrylamide/acrylic acid copolymer, sodium polyacrylate, carboxymethyl cellulose, hydroxyethyl cellulose, methyl cellulose, polysaccharide as well as naturally occurring gums such as guar gum and chemically modified gums such as hydroxypropyl guar gum. As a result of this thickening capability, there are many existing, as well as potential, industrial applications for aqueous media thickened with such water-soluble polymers.

Unfortunately, however, the aforementioned conventional water-soluble polymers suffer from many serious deficiencies or limitations in actual use in such industrial applications. For example, for reasons of efficiency and economical considerations, it is common to employ very high molecular weight versions of such polymers. However, during many industrial applications, the conditions present during the practice of the application involve exposing an aqueous medium containing the high molecular weight water-soluble polymer to high shear. Such shear often causes mechanical degradation of the polymer and thus reduces the viscosity of the aqueous medium. While lower molecular weight polymers are less sensitive to shear degradation, they must be used in much higher concentrations in order to achieve the desired level of viscosity.

Secondly, while ionic water-soluble polymers such as neutralized acrylamide/acrylic acid copolymer, sodium polyacrylate, polystyrene sulfonate and the like are more efficient thickeners in deionized water than their nonionic counterparts, their thickening ability is greatly reduced by the presence of electrolytes such as sodium chloride, calcium chloride and magnesium sulfate in the aqueous medium. Such electrolytes are present in the aqueous media employed in most industrial applications, particularly those requiring the use of ground waters in subterranean formations as in enhanced oil recovery.

Finally, in many applications, the aqueous medium thickened with water-soluble polymer is exposed to temperatures in the range of 30° to 100° C. which normally causes reduction of viscosity. Such high temperatures are particularly common in enhanced oil recovery applications wherein the aqueous medium is pumped underground to depths of 5000 to 20,000 feet, as is common for mobility control fluids and packing fluids.

In attempts to overcome some of the aforementioned deficiencies of the conventional water-soluble polymers, it has been a common practice to cross-link the polymer in order to improve resistances to thermal as well as shear degradation. See, for example, U.S. Pat. No. 3,247,171. Such attempts have generally not been successful. More recently, as taught in U.S. Pat. No. 3,984,333, an aqueous medium has been thickened by dissolving a water-soluble block copolymer having water-soluble blocks and water-insoluble blocks in the aqueous medium. While such water-soluble block copolymers apparently exhibit reasonably good resistance to shear degradation, such polymers are difficult and often impractical to prepare. More importantly, such polymers do not exhibit significant tolerance of electrolytes normally present in the aqueous media to be thickened.

While the cellulosic derivatives such as hydroxyethyl cellulose and biopolymers exhibit acceptable tolerance to the presence of electrolytes, cellulosic derivatives are generally ineffective at the low concentrations that are economical and exhibit poor thermal stability. The biopolymers such as xanthan gums exhibit acceptable thermal stability, resistance to shear degradation and electrolytic tolerance. Unfortunately, such biopolymers are generally very expensive and are susceptible to biodegradation.

In view of the aforementioned deficiencies of conventional water-soluble polymers as thickening agents, it is highly desirable to provide a relatively inexpensive thickening agent which exhibits thermal stability, electrolytic tolerance and good resistance to shear and biological degradation.

SUMMARY OF THE INVENTION

The present invention is such a thickening agent which comprises (1) a water-soluble polymer having pendant hydrophobic groups and (2) a water-dispersible surfactant having hydrophobic groups that are capable of associating with the hydrophobic groups of the polymer. The relative proportions of the two components of the thickening agent are such that, when the thickening agent is dispersed in water in a concentration of 0.5 weight percent based on the water, the viscosity of the water is at least doubled. Surprisingly, aqueous media containing the thickening agent of this invention can be subjected to substantial mechanical shear without a significant loss of viscosity. Moreover, such thickening agents provide a substantial viscosity increase even when the aqueous media contains significant concentrations of electrolyte as in the case of hard water or brine and even when exposed to temperatures up to 80° C. Consequently, such thickening agents can be used for a variety of applications wherein high temperatures, substantial electrolyte concentrations and conditions of high mechanical shear such as in high shear pumping of the aqueous medium is required. Unlike high molecular weight polymers currently available which thicken an aqueous media but which also give solutions which are stringy, the thickening agents of the invention when dispersed in an aqueous medium, exhibit suitable plastic rheology and short solution characteristics. By "short solution characteristics" is meant that an aqueous medium containing the thickening agent does not produce threads or strings of such aqueous medium when surfaces wetted with the medium are contacted and pulled apart. As a result of these and other thickening characteristics of the present invention, these thickening agents are useful in all applications which require aqueous media having increased viscosity such as drilling mud formulations, fracturing fluids, liquid mobility control agents, aqueous solutions of inorganic salts, hydraulic fluids, lubricants, friction reducing agents, suspending agents, aqueous suspensions of insoluble particulates such as paint formulations and the like.

Accordingly, in another aspect, the present invention is an aqueous medium containing an amount of the thickening agent which is effective to increase the viscosity of the aqueous medium. In a preferred embodiment in this aspect of the invention, the aqueous medium containing the thickening agent is a mobility control fluid useful in enhanced oil recovery operations. In the practice of this embodiment of the invention, the thickened aqueous medium is introduced through an injection well into a porous subterranean formation penetrated by said well and driven through the formation through the producing well.

In further aspects of this invention, the thickening agent is employed in a drilling mud formulation or a fracturing fluid wherein the thickening agent is present in an amount sufficient to increase the viscosity of the formulation or fluid as desired.

DETAILED DESCRIPTION OF THE ILLUSTRATIVE EMBODIMENTS

The thickening agent of this invention contains (1) a water-soluble polymer having pendant hydrophobic groups and (2) a water-soluble dispersible surfactant. The hydrophobic groups of the polymer are solvated by the surfactant such that the thickening agent forms a solution in water.

For the purposes of this invention, the water-soluble polymer is one which forms the thermodynamically stable mixture when combined with water. These mixtures form spontaneously and include true solutions in which the individual polymer molecules are dispersed as well as micellular or colloidal solutions wherein the polymer molecules are aggregated to some extent, but wherein such aggregates are no larger than colloidal size.

The molecular weight of the water-soluble polymer is low enough such that an aqueous medium containing 0.1 weight percent of the polymer can be subjected to a degree of shear on the order of 10,000 sec$^{-1}$ without causing the polymer to degrade significantly. Moreover, the polymer has a molecular weight such that, when 0.5 weight part of the polymer is dissolved in 100 weight parts of water, the Brookfield viscosity of the water is increased to at least 2 centipoises (as measured using a Brookfield LVT viscometer equipped with a UL adaptor and operated at 6 rpm and 25° C.). While polymers having very high molecular weight, e.g., weight average molecular weight ($M_w$) greater than 5 million, can be suitably employed, such polymers tend to degrade when subjected to high shear, e.g., in excess of 10,000 sec$^{-1}$. Accordingly such polymers are less preferred for some applications. Preferably, the water-soluble polymers used in this invention have weight average molecular weights ($M_w$) as determined by gel permeation chromatography in the range from about 200,000 to about 5 million, most preferably from about 800,000 to about 2.5 million.

The pendant hydrophobic groups of the water-soluble polymer are organic groups having hydrophobicities comparable to one of the following: aliphatic hydrocarbon groups having at least four carbons such as $C_4$ to $C_{20}$ alkyls and cycloalkyls; polynuclear aromatic hydrocarbon groups such as naphthyls; alkylaryls wherein alkyl has one or more carbons; haloalkyls of four or more carbons, preferably perfluoroalkyls; polyalkyleneoxy groups wherein alkylene is propylene or higher alkylene and there are at least 1 alkyleneoxy unit per hydrophobic moiety. The concentration of hydrophobic moieties in the water-soluble polymer is that which is sufficient to increase the viscosity of an aqueous medium containing the water dispersible surfactant. Preferably, the concentration of hydrophobic groups in the polymer is such that, when one weight part of the polymer is dissolved in 100 weight parts of the aqueous medium containing one weight part of the surfactant, the Brookfield viscosity (as defined hereinbefore) of the aqueous medium is twice that of an aqueous medium containing 1 weight percent of the surfactant and 1 weight percent of a hydrophilic polymer that is identical in all respects to the hydrophobic polymer except that the hydrophilic polymer contains no hydrophobic groups. For example, if an aqueous solution containing 1 weight percent of a surfactant and 1 weight percent of polyacrylamide (hydrophilic polymer) has a Brookfield viscosity of 10 cps, the aqueous solution containing 1 weight percent of the same surfactant and 1 weight percent of a suitable hydrophobic polyacrylamide, e.g., an acrylamide/dodecyl acrylate copolymer having a $M_w$ equivalent to the polyacrylamide, will have a Brookfield viscosity of at least 20 cps.

Exemplary water-soluble polymers include the copolymers of water-soluble ethylenically unsaturated monomers with hydrophobic ethylenically unsaturated monomers wherein the concentration of hydrophobic monomer is sufficient to provide the requisite concentration of hydrophobic moieties. Preferably, the water-soluble polymer is a copolymer from about 98 to about 99.995 mole percent of one or more water-soluble monomers with from about 0.005 to 2 mole percent of one or more hydrophobic monomers. For the water-soluble polymers, it is found that preferred amounts of hydrophobic monomers will vary with the molecular weight of the polymer. For example, a water-soluble polymer having a weight average molecular weight near 200,000, preferably contains from about 1 to about 2 mole percent of hydrophobic monomer. Alternatively, the water-soluble polymer having a weight average molecular weight of 2 million preferably contains from about 0.05 to about 0.25 mole percent of hydrophobic monomer.

Suitable water-soluble monomers include those which are sufficiently water-soluble to form at least a 10 weight percent solution when dissolved in water and readily undergo addition polymerization to form polymers which are water-soluble. Exemplary water-soluble monomers include ethylenically unsaturated amides such as acrylamide, methacrylamide and fumaramide; their N-substituted derivatives such as 2-acrylamide-2-methylpropane sulfonic acid (AMPS), N-(dimethylaminomethyl)acrylamide as well as N-(trimethylammoniummethyl)acrylamide chloride and N-(trimethylammoniumpropyl)methacrylamide chloride; ethylenically unsaturated carboxylic acids such as acrylic acid, methacrylic acid, itaconic acid and fumaric acid. Ethylenically unsaturated quaternary ammonium compounds such as vinylbenzyl trimethyl ammonium chloride, sulfoalkyl esters of unsaturated carboxylic acids such as 2-sulfoethyl methacrylate; aminoalkyl esters of unsaturated carboxylic acids such as 2-aminoethyl methacrylate; vinyl amines such as vinyl pyridine and vinyl morpholine, diallyl amines and diallyl ammonium compounds such as diallyl dimethyl ammonium chloride; vinyl heterocyclic amides such as vinyl pyrrolidone; vinylaryl sulfonates such as vinylbenzyl sulfonate as well as the salts of the foregoing monomers. Of the foregoing water-soluble monomers, acrylamide and combinations of acrylamide and acrylic acid are preferred. Acrylamide and combinations thereof with up to 75 mole percent of acrylic acid, based on total water-soluble monomer, are more preferred. Most preferred are polymers wherein the water-soluble monomer is a mixture of acrylamide with from about 5 to about 50 mole percent, especially from about 15 to about 30 mole percent of acrylic acid.

Suitable hydrophobic monomers are those which are water-insoluble, i.e., less than 0.2 weight part of the hydrophobic monomer will dissolve in 100 weight parts water. Exemplary hydrophobic monomers include the higher alkyl esters of $\alpha,\beta$-ethylenically unsaturated carboxylic acids such as dodecyl acrylate, dodecyl methacrylate, tridecyl acrylate, tridecyl methacrylate, tetradecyl acrylate, tetradecyl methacrylate, octadecyl acrylate, octadecyl methacrylate, ethyl half ester of maleic anhydride, diethyl maleate, and other alkyl esters derived from the reactions of alkanols having from 8 to 20 carbon atoms with ethylenically unsaturated carboxylic acids such as acrylic acid, methacrylic acid, maleic anhydride, fumaric acid, itaconic acid and aconitic acid, alkylaryl esters of ethylenically unsaturated carboxylic acids such as nonyl-$\alpha$-phenyl acrylate, nonyl-$\alpha$-phenyl methacrylate, dodecyl-$\alpha$-phenyl acrylate and dodecyl-$\alpha$-phenyl methacrylate; N-alkyl, ethylenically unsaturated amides such as N-octadecyl acrylamide, N-octadecyl methacrylamide, N,N-dioctyl acrylamide and similar derivatives thereof; $\alpha$-olefins such as octene-1, decene-1, dodecene-1 and hexadecene-1; vinyl alkylates wherein alkyl has at least 8 carbons such as vinyl laurate and vinyl stearate; vinyl alkyl ethers such as dodecyl vinyl ether and hexadecyl vinyl ether; N-vinyl amides such as N-vinyl lauramide and N-vinyl stearamide; and ar-alkylstyrenes such as t-butyl styrene. Of the foregoing hydrophobic monomers, the alkyl esters of acrylic acid and methacrylic acid wherein alkyl has from 8 to 20 carbon atoms, are preferred. The alkyl methacrylates wherein alkyl has from 10 to 20 carbon atoms are more preferred. Dodecyl methacrylate is the most preferred.

The aforementioned water-soluble polymers containing hydrophobic moieties are advantageously prepared by copolymerizing the water-soluble monomers with hydrophobic monomers by any of the conventional polymerization techniques wherein the hydrophobic monomer or mixture of hydrophobic monomers is added with vigorous agitation to an aqueous solution of the water-soluble monomer or mixture of water-soluble monomers. In the instances wherein the water-soluble monomer, as well as the hydrophobic monomer, are soluble in a neutral organic solvent, the water-soluble polymer can be prepared by any desired solution polymerization method wherein the neutral organic solvent is employed as the polymerization diluent. The most effective water-soluble polymers are prepared by copolymerizing the water-soluble monomers with hydrophobic monomers in a molar ratio of water-soluble monomer:hydrophobic monomer in the range from about 98:2 to about 99.995:0.005, preferably from about 99:1 to about 99.9:0.1.

Polymerization of the water-soluble and hydrophobic monomers is advantageously effected in an aqueous medium containing an emulsifier for the hydrophobic monomer and a polymerization initiator capable of generating free-radicals. The emulsifier is required in most instances to suitably disperse the hydrophobic monomer and to subsequently obtain a copolymer having a uniform composition. Optionally a chain transfer agent may be included in the polymerization reaction mixture. Accordingly, it is desirable to employ from about 0.01 to about 0.1 weight percent of initiator based on the monomers and from about 0.1 to about 1 weight percent of emulsifier based on the monomers.

Exemplary suitable polymerization initiators include the inorganic persulfates such as potassium persulfate, ammonium persulfate and sodium persulfate, azo catalysts such as azobisisobutyronitrile and dimethyl azoisobutyrate; organic peroxygen compounds such as benzyl peroxide, t-butyl peroxide, diisopropyl benzene hydroperoxide and t-butyl hydroperoxide. Of these initiators, the oil-soluble such as the organic peroxides and azo compounds are preferred.

Suitable emulsifiers include anionic agents such as alkali metal salts of alkyl sulfates and alkyl and aryl sulfates, e.g., dodecyl alkyl sulfosuccinates and sodium dodecylbenzene sulfate; fatty acid soaps, e.g., sodium oleate, sodium stearate and potassium oleate; alkali metal salts of sulfonated fatty alcohols, e.g., sodium dodecyl sulfate; sulfates of ethoxylated alcohols; alkyl phosphate esters, e.g., dodecyl hydrogen phosphate; fluoro emulsifiers, e.g., perfluoroalkyl sulfates; and the like. Also included are cationic emulsifiers such as alkylamine hydrochlorides, e.g., dodecylamine hydrochloride and tridecylamine hydrochloride; quaternary alkyl or aryl ammonium halides such as dodecyl trimethyl ammonium chloride; ethoxylated fatty amines and other emulsifiers as described in *McCutcheon's Detergents and Emulsifiers*, North American Edition, 1980 Annual. In general, when the water-soluble polymer is anionic or nonionic, an anionic emulsifier such as an alkali metal alkyl sulfate is preferably employed as the emulsifier. When the water-soluble polymer is cationic, a cationic emulsifier such as dodecylamine hydrochloride is employed. When the water-soluble polymer is nonionic, anionic or cationic, a nonionic emulsifier such as nonylphenoxy polyethylene glycol having 10 ethyleneoxy units per molecule is suitably employed.

The water-soluble polymers are readily recovered from the aqueous medium when such is desired by removal of water under vacuum or by azeotropic distillation. Alternatively, such polymers may be separated by the addition of methanol or anhydrous acetone to cause the water-soluble polymer to form a phase separate from the aqueous medium. As a further alternative, the aqueous medium containing the water-soluble polymer can be used as such.

It is also understood that water-soluble polymers of acrylamide, acrylic acid and hydrophobic monomer can be prepared by copolymerizing all three of these monomers or by copolymerizing acrylamide with the hydrophobic monomer and subsequently hydrolyzing a portion of the copolymerized acrylamide by contacting the copolymer with a base such as sodium hydroxide and/or sodium carbonate.

Surfactants suitably employed as a second component of the thickening agents of this invention are those micelle forming surface active agents which will disperse in an aqueous medium containing an effective amount of the aforementioned water-soluble polymer and which have sufficient hydrophobic moieties to combine with the water-soluble polymer to increase the viscosity of an aqueous medium containing said water-soluble polymer. Accordingly, such surfactants can be nonionic, anionic, cationic or amphoteric, with the nonionic surfactants being preferred due to their ability to remain hydrated in the presence of significant electrolyte concentration. Preferred nonionic surfactants have hydrophilic-lipophilic balances (HLB) in the range from about 2 to about 15, most preferably from about 5 to about 13. Exemplary surfactants include nonionic surfactants such as alkyl polyethyleneoxy compounds represented by the formula:

$$RO(EO)_n\text{—}H$$

wherein R is $C_8$–$C_{18}$ alkyl, EO is ethyleneoxy and n is a number from 1 to 10 and nonionic surfactants such as the reaction products of ethylene oxide or mixtures of ethylene oxide and higher alkylene oxide with active hydrogen compounds such as phenols, alcohols, carboxylic acids and amines, e.g., alkylphenoxyethyleneoxy ethanols. Also suitable are anionic substituted polyethyleneoxy compounds represented by the formula:

$$R\text{—}(EO)_n\text{—}X$$

wherein R and n are as defined hereinbefore, EO is ethyleneoxy and X is $SO_3H$ or $CO_2H$ or $PO_3H$; salts of long chain carboxylates such as potassium oleate, sodium laurate, potassium stearate, potassium caprolate, sodium palmatate and the like; alkali metal alkylbenzene sulfonates such as sodium nonylbenzene sulfonate and potassium dodecylbenzene sulfonate; alkali metal alkyl sulfates such as sodium dodecyl sulfate and alkali metal dialkyl sulfosuccinates such as sodium dihexyl sulfosuccinate and sodium dioctyl sulfosuccinate; salts of resin acids such as abietic acid and dihydroabietic acid. Also suitable are cationic surfactants such as alkyl ammonium or quaternary ammonium salts, e.g., dodecyl ammonium hydrochloride, dodecyl trimethyl quaternary ammonium chloride and the like, and ethoxylated fatty amines. Other suitable surfactants are described in McCutcheon's, supra. Also included in the aforementioned surfactants are oligomeric and polymerizable surfactants described at pages 319–322 of Blackley, *Emulsion Polymerization Theory and Practice*, John Wiley and Sons (1975). Examples of such oligomers include ammonium and alkali metal salts of functionalized oligomers sold by Uniroyal Chemical under the trade name "Polywet" and copolymers of acrylonitrile and acrylic acid having molecular weights less than 2000 which are prepared in the presence of chain terminating agents such as n-octyl mercaptan. Examples of polymerizable surfactants include sodium salts of 9- and 10-(acrylylamido)stearic acid and the like. Of the foregoing surfactants, the nonionic types are preferred, with ethoxylated alkyl phenol and ethoxylated fatty alcohols being most preferred. However, when the water soluble polymer is cationic, it is desirable to use a cationic or nonionic surfactant. When the water soluble polymer is anionic, it is desirable to employ an anionic or nonionic surfactant.

The thickening agent of the present invention is advantageously prepared by dispersing the water-soluble polymer and the surfactant in an aqueous medium under conditions such that the components are uniformly distributed throughout the aqueous medium. Alternatively and preferably, the surfactant is added to the polymerization recipe used to prepare the water-soluble polymer, and the recipe is then subjected to polymerization conditions. In such preferred embodiments, the surfactant is one which emulsifies the hydrophobic monomer in the aqueous polymerization medium and which increases the viscosity of an aqueous solution of the copolymer. While the relative proportions of the water soluble polymer and the surfactant are not particularly critical, it is generally desirable to employ proportions such that associations between the hydrophobic moieties of the water-soluble polymer and the hydrophobic moieties of the surfactant are maximized. Accordingly, the critical micelle concentration of the surfactant and the number and size of the water-soluble polymer molecules are advantageously correlated such that the hydrophobic moieties of at least two molecules of the water-soluble polymer can associate with the hydrophobic moieties of each particle (micelle) of the surfactant. Usually, the ratio of surfactant to water-soluble polymer is one that produces a viscosity at least twice that of a solution containing only the water-soluble polymer. Preferably, the weight ratio of water-soluble polymer to surfactant is from about 20:1 to about 0.5:1, most preferably from about 10:1 to about 1:1.

The amount of total thickening agent in the aqueous medium being thickened is sufficient to provide the desired increase in viscosity of the aqueous medium. Preferably, such amounts of thickening agent range from about 0.025 to about 5 weight percent, most preferably from about 0.5 to about 2.5 weight percent, based on the aqueous medium. In addition, to the thickening agent, the aqueous medium may contain a variety of other ingredients common to brines, fracturing fluids, drilling muds, paint formulations, lubricants, friction-reducing agents, suspending agents, liquid mobility control agents, hydraulic fluids and the like.

Of particular interest are the brines and other aqueous media containing salts of various metals. Such aqueous media often contain from about 0.01 to about 20 weight percent of salts of alkali metals and alkaline earth metals.

To increase the viscosity of an aqueous medium containing substantial amounts, e.g., up to about 5 weight percent based on the aqueous medium, of monovalent inorganic salts such as sodium chloride and up to 1 weight percent, usually from 0.0015 to 0.5 weight percent, of salts of polyvalent cations such as calcium and magnesium, it is preferred to employ (1) as the water-soluble polymer, (a) a nonionic copolymer of a water-soluble ethylenically unsaturated carboxamide such as acrylamide and a higher alkyl acrylate or methacrylate such as dodecyl methacrylate or (b) an anionic copolymer of sodium acrylate and higher alkyl acrylate or methacrylate, and (2) any suitable surface active agent as the surfactant. The viscosity increase in this aqueous medium is retained at temperatures over the range from about 30° to about 80° C. In many instances, this viscosity increase is retained at temperatures substantially higher than 80° C., e.g., 275° C. and higher. To increase the viscosity of an aqueous medium at a temperature of 60° to 80° C. and containing from about 10 to 15 weight percent of a monovalent salt, it is preferred to use one of the aforementioned nonionic or anionic copolymers with a nonionic surfactant having an HLB greater than 10, e.g., a dodecyl ether of polyethylene glycol containing 10 ethyleneoxy units per surfactant molecule. In contrast, to increase the viscosity of an aqueous medium at an ambient temperature and containing from about 0.1 to about 0.5 weight percent of monovalent salt, it is preferred to employ one of the aforementioned nonionic or anionic copolymers with a nonionic surfactant having an HLB less than 10 such as the dodecyl ether of a polyethylene glycol having 2 ethyleneoxy groups per surfactant molecule. Finally, to increase the viscosity of an aqueous medium containing from about 1 to about 5 weight percent of salts of polyvalent cations, e.g., calcium and/or magnesium in the form of salts such as calcium bromide, calcium chloride or magnesium sulfate, it is preferable to employ one of the aforementioned nonionic copolymers in combination with a nonionic surfactant, especially a surfactant having an HLB greater than 10, e.g., the dodecyl ether of a polyethylene glycol having 5 ethyleneoxy groups per surfactant molecule.

In general, the type of application and the conditions characteristic of the application will determine the type and amount of surfactant employed, to give the desired viscosity response. For example, it is found that a nonionic surfactant having a low HLB, e.g., an HLB of 4 to 8, is advantageously employed in an aqueous medium having a relatively low salt concentration and moderate temperature. On the other hand, a nonionic surfactant having a high HLB, e.g., an HLB of 10-14, is advantageously employed in an aqueous medium having a relatively high salt concentration and high temperature. Moreover, the desired viscosity response for a given set of conditions can be achieved by adding a single surfactant having the desired HLB value or by adding a mixture of surfactants having different HLB values which combine to provide the desired HLB value.

The following examples are given to illustrate the invention and should not be construed as limiting its scope. Unless otherwise indicated, all parts and percentages are by weight.

I. GENERAL PROCEDURE FOR PREPARAING WATER-SOLUBLE POLYMERS

A 295 ml citrate bottle is charged with 25 g of an aqueous solution containing 10 percent of sodium dodecyl sulfate. A specified higher alkyl methacrylate monomer is then dispersed into aqueous solution by adding the monomer to the bottle and agitating the contents until emulsification of the monomer is achieved. Approximately 100 ml of deionized water is added with stirring followed by the addition of an aqueous solution containing specified water-soluble monomer. Aqueous solutions of a specified chelating agent and acetic acid are then added followed by the addition of isopropyl alcohol as a chain transfer agent. A solution of azobisisobutyronitrile (initiator) in t-butyl alcohol is added followed by addition of sufficient deionized water to increase the total contents (reaction mixture) of the bottle to 250 g. The contents of the bottle are degassed by alternate cycles (5–10 cycles) of vacuum and nitrogen gas purge. The bottle is then capped and heated in a water bath at 60° C. for 16 hours in an end-over-end apparatus thereby effecting copolymerization of the monomers. Following polymerization, the contents of the bottles are cooled to room temperature and the polymer is removed from the bottle as a thick aqueous solution.

For purposes of comparison, water-soluble polymers of the water-soluble monomers which polymers do not contain the higher alkyl methacrylate are prepared according to the foregoing procedure except that the higher alkyl methacrylate is omitted. Also for comparison water-soluble polymers which contain lower alkyl acrylates are similarly prepared.

Molecular weights of the aforementioned water-soluble polymers are calculated from intrinsic viscosity measurements of aqueous solutions of such polymers. In such calculations, the following relationship is employed:

$$[\eta] = (6.31 \times 10^{-5}) M_w^{0.8}$$

wherein $[\eta]$ is intrinsic viscosity and $M_w$ is the weight average molecular weight of the polymer.

II. GENERAL PROCEDURE FOR PREPARING THICKENING AGENT

An aqueous solution of water-soluble polymer obtained in the foregoing manner is combined with a specified nonionic surfactant. The resulting solution is diluted with deionized water and slowly agitated overnight to obtain a uniform solution of the two component thickening agent of this invention.

Alternatively, the specified nonionic surfactant is added to the citrate bottle with the aqueous solution of sodium dodecyl sulfate and the aforementioned polymerization procedure is carried out as described. Following this procedure, an aqueous solution of the two component thickening agent is recovered from the citrate bottle after polymerization is complete.

EXAMPLE

Several polymers (Polymer Designation A, C, F, G, H, I, K, Q, R, S, T, U, V, AA, CC, DD, EE, and FF) are prepared according to the aforementioned general procedure using different polymerization formulations set forth in Table I. Thickening agents are then prepared by one of the two alternative procedures described hereinbefore and tested for viscosity in the presence of different salts and various concentrations as well as under different conditions such as temperature. The results of these tests are reported in Table II.

TABLE I

| Polymer Designation | Monomers, mole % | | | NaDS[1], g | AAM[2], g | $C_xMA^3$, g | AA[4], g | VA-AA[5], g | IPA[6], g | AZO[7], g | $C_{12}(EO)_5^8$, g | DI $H_2O^9$, g |
|---|---|---|---|---|---|---|---|---|---|---|---|---|
| | AAM | $C_xMA$ | AA | | | | | | | | | |
| A | 99.9 | 0.1 (x = 12) | 0 | 25 | 49.95 | 0.0895 | 0 | 2.5 | 0 | 1.00 | 0 | Make up to 250 g |
| C | 99.9 | 0.1 (x = 12) | 0 | 25 | 49.95 | 0.0895 | 0 | 2.5 | 0 | 1.00 | 7.0 | Make up to 250 g |
| F | 99.75 | 0.25 (x = 12) | 0 | 25 | 49.88 | 0.2237 | 0 | 2.5 | 0 | 1.00 | 7.0 | Make up to 250 g |
| AA* | 100 | 0 | 0 | 25 | 50 | 0 | 0 | 2.5 | 0 | 1.00 | 0 | Make up to 250 g |
| CC* | 100 | 0 | 0 | 25 | 50 | 0 | 0 | 2.5 | 0 | 1.00 | 7.0 | Make up to 250 g |
| G | 99.9 | 0.1 (x = 12) | 0 | 25 | 49.95 | 0.0895 | 0 | 2.5 | 9.37 | 1.00 | 0 | Make up to 250 g |
| H | 99.75 | 0.25 (x = 12) | 0 | 25 | 49.88 | 0.2237 | 0 | 2.5 | 9.37 | 1.00 | 0 | Make up to 250 g |
| I | 99.5 | 0.5 (x = 12) | 0 | 25 | 49.75 | 0.447 | 0 | 2.5 | 9.37 | 1.00 | 0 | Make up to 250 g |

TABLE I-continued

| Polymer Designation | Monomers, mole % | | | Polymerization Recipe | | | | | | | | |
|---|---|---|---|---|---|---|---|---|---|---|---|---|
| | AAM | C$_x$MA | AA | NaDS[1], g | AAM[2], g | C$_x$MA[3], g | AA*, g | VA-AA[5], g | IPA[6], g | AZO[7], g | C$_{12}$(EO)$_5$[8], g | DI H$_2$O[9], g |
| DD* | 100 | 0 | 0 | 25 | 50 | 0 | 0 | 2.5 | 9.37 | 1.00 | 0 | Make up to 250 g |
| K | 99.5 | 0.5 (x = 12) | 0 | 25 | 49.75 | 0.447 | 0 | 2.5 | 37.5 | 1.00 | 0 | Make up to 250 g |
| EE* | 100 | 0 | 0 | 25 | 50 | 0 | 0 | 2.5 | 37.5 | 1.00 | 0 | Make up to 250 g |
| Q* | 99.0 | 1.0 (x = 4) | 0 | 25 | 49.5 | 0.5 | 0 | 2.5 | 0 | 1.00 | 0 | Make up to 250 g |
| R* | 99.0 | 1.0 (x = 4) | 0 | 25 | 49.5 | 0.5 | 0 | 2.5 | 9.37 | 1.00 | 0 | Make up to 250 g |
| S | 99.9 | 0.1 (x = 8) | 0 | 25 | 49.95 | 0.0697 | 0 | 2.5 | 0 | 1.00 | 0 | Make up to 250 g |
| T | 99.9 | 0.1 (x = 8) | 0 | 25 | 49.95 | 0.0697 | 0 | 2.5 | 9.37 | 1.00 | 0 | Make up to 250 g |
| U | 79.9 | 0.1 (x = 12) | 20 | 25 | 39.95 | 0.0895 | 10.14 | 2.5 | 0 | 1.00 | 0 | Make up to 250 g |
| V | 49.9 | 0.1 (x = 12) | 50 | 25 | 24.95 | 0.0895 | 25.34 | 2.5 | 0 | 1.00 | 0 | Make up to 250 g |
| FF* | 80 | 0 | 20 | 25 | 40 | 0 | 10.14 | 2.5 | 0 | 1.00 | 0 | Make up to 250 g |

*Control water-soluble polymer having no hydrophobic moieties.
[1]NDS - aqueous solution of 10 weight percent of sodium dodecyl sulfate (hydrophobic monomer emulsifiers).
[2]AAM - aqueous solution of 50 weight percent of acrylamide and 17 ppm of cupric ion inhibitor
[3]C$_x$MA - alkyl methacrylate wherein x is the number of carbons in the alkyl group.
 C$_{12}$MA - dodecyl methacrylate
 C$_8$MA - 2-ethylhexyl methacrlate
 C$_4$MA - n-butyl methacrylate
[4]AA - aqueous solution of 50 weight percent of acrylic acid
[5]VA-AA - aqqueous solution of 2 weight percent of pentasodium salt of (carboxymethylimino)bis(ethylenenitrilo)-tetraacetic acid (chelating agent for Cu$^{++}$) and 16 weight percent of glacial acetic acid (pH control agent at pH of 3.8–4).
[6]IPA - an aqueous solution of 20 weight percent of isopropyl alcohol (chain transfer agent).
[7]AZO - a 1.25 weight percent solution of azobisisobutyronitrile in t-butyl alcohol.
[8]C$_{12}$(EO)$_5$ - dodecanol condensed with 5 moles of ethylene oxide (nonionic surfactant).
[9]DI H$_2$O - deionized water is added to the polymerization recipe until the total recipe weight is 250 g.

TABLE II

| Sample No. | Polymer[1] | | Post Added Surfactant[2] | | Electrolyte[3] | | Temp. °C. | Viscosity[4] cps |
|---|---|---|---|---|---|---|---|---|
| | Designation | Concentration wt. % | Type | Concentration wt. % | Type | Concentration wt. % | | |
| 1 | A | 0.25 | C$_{12}$(EO)$_5$ | 0.25 | None | — | 25 | 12 (#2) |
| 2 | " | " | " | " | NaCl | 1 | " | 130 (#2) |
| 3 | " | " | " | " | " | 2 | " | 150 (#2) |
| C$_1$** | AA* | " | " | " | None | — | " | 10 (#2) |
| C$_2$** | " | " | " | " | NaCl | 3 | " | 12 (#2) |
| 4 | A | " | C$_8$(EO)$_5$ + C$_{18}$(EO)$_5$ | 0.2 + 0.25 | " | — | 35 | 10 (#2) |
| 5 | " | " | " | " | " | 1 | " | 29 (#2) |
| 6 | " | " | " | " | " | 3 | " | 34 (#2) |
| 7 | " | " | C$_{12}$(EO)$_5$ | 0.25 | " | 1 | 30 | 105 (#2) |
| 8 | " | " | " | " | " | " | 40 | 80 (#2) |
| 9 | " | " | " | " | " | " | 50 | " |
| 10 | " | " | " | " | " | " | 60 | 300 (#2) |
| 11 | " | " | " | " | " | " | 70 | 500 (#2) |
| C$_3$** | AA* | " | " | " | " | 1 | 35 | 12.0 (#2) |
| C$_4$* | " | " | " | " | " | " | 50 | 8 (#2) |
| C$_5$** | " | " | " | " | " | " | 60 | 6 (#2) |
| C$_6$** | " | " | " | " | " | " | 70 | 5 (#2) |
| 12 | G | 0.5 | " | " | None | — | 25 | 4 (UL) |
| 13 | " | " | " | " | NaCl | 1 | " | 18 (UL) |
| 14 | " | " | " | " | " | 3 | " | 36 (UL) |
| 15 | " | " | " | " | " | 5 | " | 44 (UL) |
| 16 | H | " | " | " | None | — | " | 4.4 (UL) |
| 17 | " | " | " | " | NaCl | 2 | " | 730 (UL) |
| 18 | " | " | " | " | " | 5 | " | 710 (UL) |
| 19 | " | 1 | " | " | " | 1 | " | 1018 (UL) |
| 20 | " | " | " | " | " | 5 | " | 982 (UL) |
| C$_7$** | DD* | 0.5 | " | " | None | — | " | 3.3 (UL) |
| C$_8$** | " | " | " | " | NaCl | 1 | " | 4.2 (UL) |
| C$_9$** | " | " | " | " | " | 2 | " | 4.3 (UL) |
| C$_{10}$** | " | " | " | " | " | 5 | " | 4.8 (UL) |
| C$_{11}$** | " | 1 | " | " | None | — | " | 8.0 (UL) |
| C$_{12}$** | " | " | " | " | NaCl | 5 | " | 8.6 (UL) |
| 21 | I | 0.5 | " | " | " | 2 | 23 | 700 (#2) |
| 22 | " | " | " | " | " | " | 40 | 500 (#2) |
| 23 | " | " | " | " | " | " | 50 | 380 (#2) |
| 24 | " | " | " | " | " | " | 60 | 330 (#2) |
| 25 | " | " | " | " | " | 3 | 23 | 720 (#2) |

TABLE II-continued

| Sample No. | Polymer[1] Designation | Polymer[1] Concentration wt. % | Post Added Surfactant[2] Type | Post Added Surfactant[2] Concentration wt. % | Electrolyte[3] Type | Electrolyte[3] Concentration wt. % | Temp. °C. | Viscosity[4] cps |
|---|---|---|---|---|---|---|---|---|
| 26 | " | " | " | " | " | " | 40 | 820 (#2) |
| 27 | " | " | " | " | " | " | 65 | 900 (#2) |
| 28 | " | " | " | " | " | " | 70 | 790 (#2) |
| $C_{13}$** | DD* | " | " | " | " | " | 23 | 4.5 (UL) |
| $C_{14}$** | " | " | " | " | " | " | 70 | 2.2 (UL) |
| 29** | Q* | 0.2 | " | 0.08 | " | 1 | 25 | 5.6 (UL) |
| 30** | " | " | " | " | " | 5 | " | 6.3 (UL) |
| 31** | R* | 0.5 | " | 0.2 | None | — | " | 4.5 (UL) |
| 32** | " | " | " | " | NaCl | 1 | " | 4.9 (UL) |
| 33** | " | " | " | " | " | 5 | " | 4.7 (UL) |
| 34 | S | 0.2 | " | 0.08 | " | 1 | " | 8.1 (UL) |
| 35 | " | " | " | " | " | 5 | " | 12.5 (UL) |
| 36** | T | 0.5 | " | 0.2 | " | 1 | " | 5.2 (UL) |
| 37** | " | " | " | " | " | 5 | " | " |
| 38** | K | 2 | None | — | None | — | " | 24 (#2) |
| 39 | " | " | $C_{12}(EO)_1$ | 0.2 | " | — | " | 40 (#2) |
| 40 | " | " | " | 0.5 | " | — | " | 280 (#2) |
| 41 | " | 1 | " | " | " | — | " | 80 (#2) |
| 42 | " | " | " | 1.0 | " | — | " | 680 (#2) |
| 43 | " | 1.5 | " | 0.5 | " | — | " | 120 (#2) |
| 44 | " | " | " | 1.0 | " | — | " | 2240 (#2) |
| $C_{15}$** | EE* | 2 | None | — | " | — | " | 3–5 (#2) |
| $C_{16}$** | " | " | $C_{12}(EO)_1$ | 0.2 | " | — | " | 5 (#2) |
| $C_{17}$** | " | " | " | 1.0 | " | — | " | 6.5 (#2) |
| 45 | C | 0.5 | None | — | " | — | 23 | 37.5 (UL) |
| 46 | " | " | " | — | KCl | 1 | " | 157.5 (UL) |
| 47 | " | " | " | — | " | 2 | " | 200 (UL) |
| 48 | " | 0.25 | " | — | None | — | " | 20 (UL) |
| 49 | " | " | " | — | KCl | 1 | " | 35 (UL) |
| 50 | " | " | " | — | " | 2 | " | " |
| 51 | F | 0.5 | " | — | None | — | " | 37.5 (UL) |
| 52 | " | " | " | — | KCl | 1 | " | 1675 (UL) |
| 53 | " | " | " | — | " | 2 | " | 2150 (UL) |
| 54 | " | 0.25 | " | — | None | — | " | 25 (UL) |
| 55 | " | " | " | — | KCl | 1 | " | 200 (UL) |
| 56 | " | " | " | — | " | 2 | " | 250 (UL) |
| $C_{18}$** | CC* | 0.5 | " | — | None | — | " | 19.5 (UL) |
| $C_{19}$** | " | " | " | — | KCl | 2 | " | 23.5 (UL) |
| $C_{20}$** | " | 0.25 | " | — | None | — | " | 6.0 (UL) |
| $C_{21}$** | " | " | " | — | KCl | 2 | " | 7.0 (UL) |
| 57 | F | 1 | " | — | None | — | 22 | 200 (#2) |
| 58 | " | " | " | — | $CaCl_2$ | 2 | " | >5000 (#2) |
| 59 | " | 0.5 | " | — | " | 1 | " | 1100 (#2) |
| 60 | " | 0.25 | " | — | " | 0.5 | " | 75 (#2) |
| 61 | " | " | " | — | " | 5 | " | 200 (#2) |
| 62 | " | " | 41 | — | " | 10 | " | 495 (#2) |
| 63 | " | 0.125 | " | — | " | 5 | " | 20 (#2) |
| 64 | " | 0.5 | " | — | $MgSO_4$ | 1 | " | 750 (#2) |
| 65 | " | 0.25 | " | — | " | " | " | 75 (#2) |
| 66 | " | " | " | — | " | 5 | " | 162 (#2) |
| 67 | " | " | " | — | " | 10 | " | 1850 (#2) |
| $C_{22}$** | CC* | 0.5 | " | — | $CaCl_2$ | 1 | " | 30 (#2) |
| $C_{23}$** | " | 0.25 | " | — | " | 5 | " | 10 (#2) |
| $C_{24}$** | " | " | " | — | " | 10 | " | " |
| $C_{25}$** | " | 0.5 | " | — | $MgSO_4$ | 2 | " | " |
| $C_{26}$** | " | " | " | — | " | 10 | " | " |
| 68 | U | 0.125 | $C_{12}(EO)_5$ | 0.0625 | None | — | 25 | 610 (#2, pH 7.5) |
| 69 | " | " | " | " | KCl | 2 | " | 900 (#2, pH 7.5) |
| 70 | " | " | " | " | " | 5 | " | 500 (#2, pH 7.5) |
| 71 | " | " | " | " | " | 10 | " | 325 (#2, pH 7.5) |
| 72 | V | 0.1 | " | 0.05 | None | — | " | 660 (#2, pH 7.5) |
| 73 | " | " | " | " | KCl | 3 | " | 900 (#2, pH 7.5) |
| 74 | " | " | " | " | " | 5 | " | 625 (#2, pH 7.5) |
| 75 | " | " | " | " | " | 10 | " | 400 (#2, pH 7.5) |
| 76 | " | 0.0625 | " | 0.031 | None | — | " | " |
| 77 | " | " | " | " | KCl | 1 | " | 48 (#2, pH 7.5) |
| $C_{27}$** | FF* | 0.25 | " | 0.125 | None | — | " | 1100 (#2, pH 7.5) |
| $C_{28}$** | " | " | " | " | KCl | 2 | " | 30 (#2, pH 7.5) |
| $C_{29}$** | " | " | " | " | " | 4 | " | 25 (#2, pH 7.5) |
| $C_{30}$** | " | " | " | " | " | 10 | " | " |
| $C_{31}$** | " | 0.0625 | " | 0.031 | None | — | " | 250 (#2, pH 7.5) |

TABLE II-continued

| Sample No. | Polymer[1] Designation | Concentration wt. % | Post Added Surfactant[2] Type | Concentration wt. % | Electrolyte[3] Type | Concentration wt. % | Temp. °C. | Viscosity[4] cps |
|---|---|---|---|---|---|---|---|---|
| $C_{32}$** | " | " | " | " | KCl | 1 | " | 4 (#2, pH 7.5) |

*Control water-soluble polymer having no or insufficient hydrophobic moieties.
**Not an example of the invention.
[1]Polymer designation as specified in Table I. Concentrations of polymer in weight percent based on total aqueous solution.
[2]Post added surfactant means surfactant added to aqueous solution of polymer after (post) polymerization is completed.
$C_{12}(EO)_5$ - dodecanol condensed with 5 moles of ethylene oxide (nonionic surfactant).
$C_8(EO)_5$ - octanol condensed with 5 moles of ethylene oxide (nonionic surfactant).
$C_{18}(EO)_5$ - octadecanol condensed with 5 moles of ethylene oxide (nonionic surfactant).
$C_{12}(EO)_1$ - dodecanol condensed with a mole of ethylene oxide (nonionic surfactant).
Concentration of surfactant is weight percent based on total aqueous solution.
[3]Concentration of electrolyte (salt) is weight percent based on total aqueous solution.
[4]Brookfield viscosity is measured using a Brookfield LVT viscometer operating at specified temperature and using a UL adaptor or #2 spindle as specified in the parenthesis rotating at 6 rpm.

As shown by Sample Nos. 1–6, the addition of NaCl to an aqueous solution of a preferred thickening agent of this invention wherein the surfactant ($C_{12}(EO)_5$) is added to the water-soluble copolymer having hydrophobic moieties (AAM/$C_{12}$MA-99.9/0.1) (Polymer A) increases the viscosity of the solution several times. In contrast, as shown by Sample Nos. $C_1$–$C_2$, similar addition of NaCl to an aqueous solution of polyacrylamide (Polymer AA) and the same surfactant ($C_{12}(EO)_5$) does not increase viscosity. Similarly, as shown by Sample Nos. 7–11, increase of temperature to 70° C. of solutions containing the thickening agent used in Sample Nos. 1–6 actually increases viscosity of the solution, whereas as shown in Sample Nos. $C_3$–$C_6$, a similar temperature increase in solutions containing polyacrylamide and $C_{12}(EO)_5$ surfactant actually decreases the viscosity of the solution.

As shown by Sample Nos. 12–15, addition of NaCl to an aqueous solutions of $C_{12}(EO)_5$ surfactant and an AAM/$C_{12}$MA (99.9/0.1) copolymer (Polymer G) having a lower molecular weight ($M_w$=800,000) than the copolymer ($M_w$=2.5–3 million) of Sample Nos. 1–6 causes a similar increase in viscosity. Sample Nos. 16–20 show that an increase of $C_{12}$MA from 0.1 to 0.25 (Polymer H) causes a substantial increase in viscosity of solutions containing relatively low electrolyte concentrations. In contrast, Sample Nos. $C_7$–$C_{12}$ show that addition of salt does not increase viscosity of aqueous solutions containing $C_{12}(EO)_5$ surfactant and a polyacrylamide having an $M_w$ of about 800,000 (Polymer DD).

As shown by Sample Nos. 21–28, aqueous solutions of AAM/$C_{12}$MA (99.5/0.5) copolymer (Polymer I) and $C_{12}(EO)_5$ surfactant retains much of its viscosity in the presence of significant salt concentrations and increase of temperature to 70° C. In fact, the ability of such solutions to undergo temperature increase without significant loss of viscosity is enhanced by increased concentrations of salt. In contrast, as shown by Sample Nos. $C_{13}$–$C_{14}$, an aqueous solution of polyacrylamide (Polymer DD) and the $C_{12}(EO)_5$ surfactant undergoes a loss of viscosity when subjected to an increase in temperature.

As shown by Sample Nos. 29–33, aqueous solutions of $C_{12}(EO)_5$ surfactant and AAM/$C_4$MA (99/1) copolymer (Polymers Q and R) do not exhibit significant viscosity increases upon addition of salt. This is believed to be due to the fact that there is not sufficient association between the hydrophobic dodecyl group of the $C_{12}(EO)_5$ surfactant and the butyl group of the butyl acrylate of the AAM/$C_4$MA copolymer (Polymers Q and R). In contrast, as shown by Sample Nos. 34–35, aqueous solutions of $C_{12}(EO)_5$ surfactant and AAM/$C_8$MA copolymer having an $M_w$ of 2.5–3.5 million (Polymer S) do exhibit an increase in viscosity upon addition of salt. Similar solutions (Sample Nos. 36–37) wherein the AAM/$C_8$MA copolymer contains only 0.1 mole percent of octyl methacrylate ($C_8$MA) and has an $M_2$ of 800,000 (Polymer T) do not exhibit an increase in viscosity upon addition of salt. This data indicates that sufficient association between the octyl groups of $C_8$MA and the dodecyl groups of $C_{12}(EO)_5$ will occur if the AAM/$C_8$MA contains a sufficient mole percent of $C_8$MA and/or has sufficient molecular weight.

As shown by Sample Nos. 38–44, aqueous solutions of an AAM/$C_{12}$MA (99.5/0.5) copolymer having an $M_w$ of only 200,000 (Polymer K) exhibit significant increases in viscosity when small amounts of $C_{12}(EO)_1$ surfactant are added. Accordingly, it is shown that aqueous solutions of substantial viscosity can be prepared in the absence of an electrolyte. In contrast, as shown in Sample Nos. $C_{15}$–$C_{17}$, aqueous solutions of low molecular weight polyacrylamide ($M_w$=200,000) (Polymer EE) do not exhibit any increase in viscosity when combined with the $C_{12}(EO)_1$ surfactant.

As shown by Sample Nos. 45–56, aqueous solutions of AAM/$C_{12}$MA (99.9/1) copolymer (Polymer C) or AAM/$C_{12}$MA (99.75/0.25) copolymer (Polymer F) and $C_{12}(EO)_5$ surfactant which is present during polymerization exhibit increased viscosities when KCl is added to the solutions. Accordingly, it is shown that the surfactant can be added prior to polymerization. In contrast, as shown in Sample Nos. $C_{18}$–$C_{21}$, aqueous solutions of polyacrylamide and $C_{12}(EO)_5$ surfactant which is present during polymerization do not exhibit increased viscosity where KCl is added to the solutions.

As shown by Sample Nos. 57–67, aqueous solutions of AAM/$C_{12}$MA (99.75/0.25) copolymer (Polymer F) and $C_{12}(EO)_5$ surfactant which is present during polymerization exhibit substantial viscosity increases when salts of divalent cations such as $CaCl_2$ or $MgSO_4$ are added to the solutions. Such increases in viscosity are not obtained when such salts are added to aqueous solutions of polyacrylamide and $C_{12}(EO)_5$ surfactant (Sample Nos. $C_{22}$–$C_{26}$).

As shown in Sample Nos. 68–77, aqueous solutions of AAM/$C_{12}$MA/AA (49.9/0.1/50) copolymer (Polymer U) or AAM/$C_{12}$MA/AA (74.9/0.1/25) copolymer (Polymer V) and $C_{12}(EO)_5$ surfactant exhibit good retention of viscosity even upon addition of substantial amounts of KCl. In contrast, as shown by Sample Nos. $C_{27}$–$C_{32}$ aqueous solutions of AAM/AA (80/20) copolymer (Polymer FF) and $C_{12}(EO)_5$ surfactant exhibit almost a total loss of viscosity as KCl is added to the solution.

What is claimed is:

1. A water soluble composition for thickening aqueous liquids comprising
   (A) a water-soluble thickening agent which agent comprises
   (1) a water-soluble polymer having pendant hydrophobic groups, said polymer being a copolymer of a water-soluble ethylenically unsaturated monomer and water-insoluble ethylenically unsaturated monomer having a hydrophobic group having at least 8 carbon atoms, wherein
   (a) the water-soluble monomer is an ethylenically unsaturated amide or an N-substituted derivative thereof, an ethylenically unsaturated carboxylic acid, an ethylenically unsaturated quaternary ammonium compound, a sulfoalkyl ester of an unsaturated carboxylic acid, an aminoalkyl ester of an unsaturated carboxylic acid, a diallylamine, a diallylammonium compound or a vinylaryl sulfonate, and (b) the water-insoluble monomer is a higher alkyl ester of an α,β-ethylenically unsaturated carboxylic acid, an alkylaryl ester of an ethylenically unsaturated carboxylic acid, an N-alkyl ethylenically unsaturated amide, vinyl alkyl ether or an ar-alkyl styrene; and
   (2) a water-dispersible nonionic surfactant having hydrophobic groups that are capable of associating with the hydrophobic groups of the copolymer such that at ambient conditions, water containing 0.5 weight percent of the thickening agent has a viscosity at least twice the viscosity of water, said thickening agent having a weight ratio of the copolymer to the surfactant in the range from about 20:1 to about 0.5:1, and
   (B) a water-soluble inorganic salt in an amount such that at a temperature in the range up to about 80° C., an aqueous medium containing a viscosity increasing amount of the thickening agent exhibits a further increase in viscosity when the water-soluble salt is added to the medium.

2. A water-soluble composition for thickening aqueous liquids which composition comprises
   (A) a water-soluble thickening agent comprising
   (1) a water-soluble polymer having pendant hydrophobic groups, said polymer being a copolymer of a water-soluble ethylenically unsaturated monomer and water-insoluble ethylenically unsaturated monomer having a hydrophobic group, wherein
   (a) the water-soluble monomer is acrylamide, methacrylamide and fumaramide; 2-acrylamide-2-methylpropane sulfonic acid, N-(dimethylaminomethyl)acrylamide, N-(trimethylammoniummethyl)acrylamide chloride, N-(trimethylammoniumpropyl)methacrylamide chloride, acrylic acid, methacrylic acid, itaconic acid and fumaric acid, vinylbenzyl trimethyl ammonium chloride, 2-sulfoethyl methacrylate, 2-aminoethyl methacrylate, vinyl pyridine, vinyl morpholine, diallyl dimethyl ammonium chloride, vinyl pyrrolidone or a salt of vinylbenzyl sulfonate and (b) the water-insoluble monomer is 2-ethylhexyl methacrylate, dodecyl acrylate, dodecyl methacrylate, tridecyl acrylate, tridecyl methacrylate, tetradecyl acrylate, tetradecyl methacrylate, octadecyl acrylate, octadecyl methacrylate, ethyl half ester of maleic anhydride, diethyl maleate, and other alkyl esters derived from the reactions of alkanols having from 8 to 20 carbon atoms with ethylenically unsaturated carboxylic acids selected from the group consisting of acrylic acid, methacrylic acid, maleic anhydride, fumaric acid, itaconic acid and aconitic acid, nonyl-α-phenyl acrylate, nonyl-α-phenyl methacrylate, dodecyl-α-phenyl acrylate, dodecyl-α-phenyl methacrylate, N-octadecyl acrylamide, N-octadecyl methacrylamide, N,N-dioctyl acrylamide; octene-1, decene-1, dodecene-1, hexadecene-1, vinyl laurate, vinyl stearate, dodecyl vinyl ether, hexadecyl vinyl ether, N-vinyl lauramide, N-vinyl stearamide or t-butyl styrene;
   (2) a water-dispersible nonionic surfactant having hydrophobic groups that are capable of associating with the hydrophobic groups of the copolymer such that at ambient conditions, water containing 0.5 weight percent of the thickening agent has a viscosity at least twice the viscosity of water, said thickening agent having a weight ratio of the copolymer to the surfactant in the range from about 20:1 to about 0.5:1; and
   (B) a water-soluble inorganic salt of a metal in an amount such that at a temperature in the range up to about 80° C., an aqueous medium containing a viscosity increasing amount of the thickening agent exhibits a further increase in viscosity when the water-soluble salt is added to the medium, said amount of salt being in the range from about 0.01 to about 20 weight percent based on the medium.

3. The composition of claim 2 wherein the water-soluble monomer is acrylamide, acrylic acid or a mixture of acrylamide and acrylic acid and the hydrophobic monomer is dodecyl methacrylate or t-butyl styrene.

4. The composition of claim 3 wherein the water-soluble polymer is a copolymer of acrylamide and dodecyl methacrylate or a copolymer of acrylamide, acrylic acid and dodecyl methacrylate.

5. The composition of claim 1, 3 or 4 wherein the polymer has a weight average molecular weight in the range from about 200,000 to about 5 million.

6. The composition of claim 1, 3 or 4 wherein the water-soluble polymer contains from about 98 to about 99.995 mole percent of one or more of the water-soluble monomers and from about 0.005 to about 2 mole percent of one or more hydrophobic monomers.

7. The composition of claim 1, 2 or 3 wherein the nonionic surfactant has an HLB in the range from about 2 to about 15.

8. The composition of claim 1, 2 or 3 wherein the surfactant has an HLB in the range from about 5 to about 13.

9. The composition of claim 1, 2 or 3 wherein the surfactant is an alkyl polyethyleneoxy compound represented by the formula:

RO(EO)$_n$H wherein R is a $C_8$–$C_{18}$ alkyl, EO is ethyleneoxy, and n is a number from 1 to 10, said surfactant having an HLB in the range from about 5 to about 13.

10. The composition of claim 1, 2 or 3 wherein the surfactant is a reaction product of ethylene oxide or mixture of ethylene oxide and a higher alkylene oxide with an active hydrogen compound, said surfactant having an HLB in the range from about 2 to about 15.

11. The composition of claim 1, 2 or 4 wherein the surfactant is a dodecyl polyethyleneoxy glycol monoether wherein the monoether has about 1 to about 10 ethyleneoxy groups per molecule.

12. The composition of claim 11 wherein the monoether has 5 ethyleneoxy groups per molecule.

13. The agent of claim 11 wherein the surfactant comprises a mixture of surfactants having different HLB values.

14. An aqueous composition comprising an aqueous phase having dispersed therein the composition of claim 1, 2, 3 or 4 in an amount sufficient to increase the viscosity of said aqueous phase.

15. An aqueous composition comprising an aqueous phase having dispersed therein a viscosity increasing amount of the composition of claim 7.

16. An aqueous composition comprising an aqueous phase having dispersed therein a viscosity increasing amount of the composition of claim 9.

17. An aqueous composition comprising an aqueous phase having dispersed therein a viscosity increasing amount of the composition of claim 10.

18. An aqueous composition comprising an aqueous phase having dispersed therein a viscosity increasing amount of the composition of claim 11.

19. The composition of 15 wherein the polymer is a copolymer of from about 60 to about 99.9 mole percent of acrylamide, from 0 to about 30 mole percent of acrylic acid and from about 0.1 to about 10 weight percent of dodecyl methacrylate and the surfactant is a dodecyl polyethyleneoxy glycol monoether wherein the monoether has about 1 to 10 ethyleneoxy groups per molecule.

20. The composition of claim 19 wherein the copolymer is a copolymer from about 99 to about 99.9 mole percent of acrylamide and from about 0.1 to about 1 weight percent of dodecyl methacrylate and the monoether has 5 ethyleneoxy groups per molecule.

21. The composition of claim 15 wherein the inorganic salt is a salt of a monovalent cation which salt is present in an amount from about 0.1 to about 15 weight percent based on the aqueous composition.

22. The composition of claim 21 wherein the salt is sodium chloride or potassium chloride or a mixture thereof.

23. The composition of claim 22 wherein the inorganic salt is a salt of a divalent metal which salt is present in an amount from about 0.01 to about 10 weight percent based on the composition.

24. The composition of claim 23 wherein the divalent metal is calcium, magnesium or a mixture thereof.

25. The composition of claim 17 which contains from about 0.025 to about 5 weight percent of the thickening agent.

26. The composition of claim 15 which also contains sufficient amounts of ingredients common to a fracturing fluid used in oil recovery to be useful as such a fracturing fluid.

27. the composition of claim 15 which also contains sufficient amounts of ingredients common to a drilling mud formulation to be useful as a drilling mud.

28. The composition of claim 15 which also contains sufficient amounts of ingredients common to a fluid mobility control agent useful in enhanced oil recovery.

29. A thickened aqueous composition which composition comprises
(A) water having dispersed therein
(1) a viscosity increasing amount of a water-soluble copolymer of from about 40 to about 99.9 mole percent of acrylamide, from 0 to about 50 mole percent of acrylic acid and from about 0.1 to about 10 mole percent of an alkyl methacrylate or acrylate wherein alkyl has from 8 to 12 carbon atoms;
(2) an alkyl polyethyleneoxy glycol monoether wherein alkyl has from 8 to 20 carbon atoms and there are from 1 to 12 ethyleneoxy groups per molecule of the monoether; and
(3) from about 0.01 to about 20 weight percent of a salt of an alkali metal or an alkaline earth metal;
in said composition the weight ratio of copolymer to monoether being in the range from about 20:1 to about 0.5:1.

30. A thickened aqueous composition comprising an aqueous medium having dispersed therein
(1) from about 0.1 to about 1 weight percent of a water-soluble copolymer of 40 to about 99.9 mole percent of acrylamide, from 0 to about 50 mole percent of acrylic acid and from about 0.1 to about 10 mole percent of an alkyl methacrylate or acrylate wherein alkyl has from 8 to 12 carbon atoms, said copolymer having a weight average molecular weight in the range from about 800,000 to about 3 million;
(2) from about 0.0015 to about 0.5 weight percent of an alkyl polyethyleneoxy glycol monoether wherein alkyl has from 8 to 20 carbons and there are from 1 to 12 ethyleneoxy groups per molecule of monoether; and
(3) from about 0.01 to about 20 weight percent of a salt of an alkali metal or an alkaline earth metal, said alkyl groups of the monoether being capable of associating with the alkyl groups of the copolymer in the thickened aqueous composition, and said copolymer, monoether and salt being present in amounts sufficient to increase the viscosity of the aqueous medium.

31. The composition of claim 30 wherein the weight ratio of the copolymer to the monoether is in the range from about 20:1 to about 0.5:1.

32. A fracturing fluid useful in oil recovery containing a viscosity increasing amount of the composition of claim 30.

33. A fluid mobility control agent useful in enhanced oil recovery containing a viscosity increasing amount of the composition of claim 30.

34. A thickened aqueous composition comprising
(A) an aqueous medium having dissolved therein;
(B) a viscosity increasing amount in the range from about 0.025 to about 5 weight percent of a thickening agent comprising
(1) a copolymer of from about 98 to about 99.995 mole percent of one or more water-soluble ethylenically unsaturated monomers and from about 0.005 to about 2 mole percent of one or more water-insoluble ethylenically unsaturated monomers having hydrophobic groups having at least 8 carbon atoms wherein the water-insoluble monomer is a higher alkyl ester of an α,β-ethylenically unsaturated carboxylic acid, an alkylaryl ester of an ethylenically unsaturated carboxylic acid, an N-alkyl ethylenically unsaturated amide or an ar-alkyl styrene, and (2) a water-dispersible, nonionic surfactant having hydrophobic groups that are capable of associating with the hydrophobic groups of the copolymer wherein the weight ratio of copolymer to surfactant is in the range from about 20:1 to about 0.5:1; and (C) an amount of a water-soluble inorganic salt in the range from about 0.01 to about 20 weight percent based on the medium which is sufficient to increase the viscosity of the aqueous medium containing the thickening agent.

35. The composition of claim 34 wherein the water-soluble monomer is acrylamide, acrylic acid or a mixture of acrylamide and acrylic acid; the water-insoluble monomer is (a) an alkyl ester of an ethylenically unsaturated carboxylic acid wherein alkyl has from 8 to 20 carbons or (b) an ar-alkylstyrene; the surfactant is an alkyl polyethyleneoxy compound represented by the formula:

$$RO(EO)_n\text{—}H$$

wherein R is a $C_8$–$C_{18}$ alkyl, EO is ethyleneoxy and n is a number from 1 to 10, and the inorganic salt is a salt of a alkali metal or an alkaline earth metal or a combination of two or more of such salts and is present in the composition in an amount in the range from about 0.01 to about 20 weight percent.

36. The composition of claim 35 wherein the water-soluble monomer is a mixture of acrylamide and from about 5 to about 50 mole percent of acrylic acid, the water-insoluble monomer is dodecyl methacrylate or t-butyl styrene and the salt is a mixture of sodium chloride and salts of calcium and magnesium.

* * * * *

UNITED STATES PATENT AND TRADEMARK OFFICE
CERTIFICATE OF CORRECTION

PATENT NO. : 4,432,881
DATED : February 21, 1984
INVENTOR(S) : Syamalarao Evani

It is certified that error appears in the above—identified patent and that said Letters Patent is hereby corrected as shown below:

Title Page, in the Abstract, line 8, "emloyed" should read
-- employed --

Column 6, line 11, "oil-soluble" should read
-- oil-soluble types --

Column 9, line 31, "PREPARAING" should read
-- PREPARING --

Column 11, under TABLE I, line 6, "methacrlate" should read
-- methacrylate --

Column 11, under TABLE I, line 9, "aqqueous" should read
-- aqueous --

Column 13, TABLE II, under Sample No., "33**" should read
-- 33* --

Column 13, TABLE II, under Type, Sample No. 62, "41"
should read -- " --

UNITED STATES PATENT AND TRADEMARK OFFICE
CERTIFICATE OF CORRECTION

PATENT NO. : 4,432,881

DATED : February 21, 1984

INVENTOR(S) : Syamalarao Evani

It is certified that error appears in the above—identified patent and that said Letters Patent is hereby corrected as shown below:

Column 15, line 35, "solutions" should read -- solution --

Column 16, line 23, "$M_2$" should read -- $M_w$ --

Column 19, line 15, Claim 13, "agent" should read -- composition --

Column 19, line 35, Claim 19, "of 15" should read -- of claim 15 --

Column 20, line 1, Claim 27, "the" should read -- The --

Signed and Sealed this

Nineteenth Day of March 1985

[SEAL]

Attest:

DONALD J. QUIGG

Attesting Officer    Acting Commissioner of Patents and Trademarks